United States Patent [19]

Manning

[11] 4,128,433
[45] Dec. 5, 1978

[54] DENSE AND IMPERVIOUS STABILIZED HAFNIUM OXIDE CERAMIC

[75] Inventor: William R. Manning, Richmond, Mich.

[73] Assignee: Champion Spark Plug Company, Toledo, Ohio

[21] Appl. No.: 906,063

[22] Filed: May 15, 1978

Related U.S. Application Data

[63] Continuation-in-part of Ser. No. 782,010, Mar. 28, 1977, abandoned, which is a continuation-in-part of Ser. No. 698,414, Jun. 21, 1976, abandoned.

[51] Int. Cl.$^2$ .................... C04B 35/00; C04B 35/50
[52] U.S. Cl. ........................................ 106/55; 106/58; 106/62; 106/63; 106/65; 106/67; 106/69; 106/73.2; 106/73.4; 123/119 E; 204/195 S; 431/76
[58] Field of Search ............... 106/55, 73.2, 62, 65, 106/69, 58, 63

[56] References Cited

U.S. PATENT DOCUMENTS

| | | | |
|---|---|---|---|
| 3,287,143 | 11/1966 | Yavorsky | 106/55 |
| 3,993,844 | 11/1976 | Kiger et al. | 106/55 |

*Primary Examiner*—Helen McCarthy
*Attorney, Agent, or Firm*—John C. Purdue

[57] ABSTRACT

A method for producing a dense and impervious stabilized hafnium oxide ceramic having zero percent water absorption is disclosed. The hafnium oxide is stabilized in the sense that a solid solution with $Y_2O_3$ is formed. The solid solution has a cubic crystal structure which, because of its similarity to the structure of the mineral fluorite, is sometimes called a "fluorite phase"; unlike hafnium oxide alone, which undergoes a destructive phase transformation from tetragonal to monoclinic during cooling, the cubic structure of the solid solution remains stable during cooling of a ceramic article. The ceramic is made by producing an intimate dry mixture consisting essentially, on an oxide basis, of hafnia, yttria and at least one oxide selected from the group consisting of silica, alumina, calcia, magnesia, baria and strontia, yttria constituting substantially 8 to 12 mole percent of said article based upon the total number of moles of hafnia and yttria, and silica, alumina, calcia, magnesia, baria and strontia constituting from ¼ percent to 4 percent, based upon the weight of hafnia and yttria, with the proviso that calcia, magnesia, baria and strontia constitute not more than 70 percent by weight of the total of silica, alumina, calcia, magnesia, baria and strontia, pressing the dry mixture into a predetermined shape, and sintering the shape to a gas impervious condition at a temperature from 2700° F. to 3000° F. A stabilized, dense, hafnium oxide ceramic has the capability of conducting oxygen anions, a requisite of the solid electrolyte in an oxygen concentration cell. Such a cell can be used as an oxygen sensor in apparatus for controlling the operation of an internal combustion engine to maintain substantially the stoichiometric air-fuel ratio. When the air-fuel ratio is closely controlled, a three-way catalytic converter can be used to control emissions of hydrocarbons, CO and $NO_x$ within the limits presently specified for 1978.

1 Claim, No Drawings

DENSE AND IMPERVIOUS STABILIZED HAFNIUM OXIDE CERAMIC

REFERENCE TO RELATED APPLICATIONS

This is a continuation in part of application Ser. No. 782,010, filed Mar. 28, 1977 which was a continuation-in-part of application Ser. No. 698,414, filed June 21, 1976, both now abandoned.

BACKGROUND OF THE INVENTION

Emission control apparatus which automatically regulates the fuel-air ratio of an internal combustion engine to the stoichiometric ratio under all conditions of operation is presently known[1]. Control is on the basis of an EMF developed by an oxygen concentration cell which provides a sharp voltage change at the stoichiometric air-fuel ratio. The cell includes a solid electrolyte having zero open porosity, and capable of conducting oxygen ions between an interior portion of the solid electrolyte which is in contact with ambient air and an exterior portion thereof which is in contact with exhaust gases from the internal combustion engine. An EMF is developed between suitable electrodes, one on the interior of the solid electrolyte and one on the exterior thereof; the magnitude of this EMF is monitored, and the air-fuel ratio is controlled to maintain the magnitude of the monitored EMF at the one which indicates the stoichiometric air-fuel ratio.

[1] See H. Dueker, K. H. Friese and W. D. Haeker, Paper 750223 presented at S.A.E. Automotive Engineering Congress and Exposition, Detroit, 1975 and cited references, and U.S. Pat. Nos. 3,960,692 and 3,960,693.

Stabilized[2] zirconia ceramics have been suggested for use as a solid electrolytes in oxygen sensors of the type in question. To be suitable for use as a solid electrolyte, a ceramic must be impervious because, otherwise, diffusion of gaseous oxygen through the ceramic will cause polarization of an associated electrode and, consequently, a reduced EMF. Several sintering aids have been suggested for use in stabilized zirconia ceramics to enable the production of impervious bodies at reasonable firing temperatures. Examples of such sintering aids[3] include alumina, titania, silica, combinations of alumina and titania, combinations of alumina and silica in which alumina is not more than 50 percent of the weight of the sintering aid and a glass containing CaO, MgO, $Al_2O_3$ and $SiO_2$ in certain proportions.

[2] A zirconium oxide ceramic, like a hafnium oxide ceramic, if not stabilized, undergoes a destructive tetragonal to monoclinic inversion. Yttrium oxide, calcium oxide, magnesium oxide and rare earth oxides have been suggested as stabilizers for zirconia ceramics.

[3] See for example, U.S. Pat. Nos. 3,565,645, 3,607,323 and 3,843,400, as well as British Patent No. 1,385,464

It has been found[4] that yttria, calcium oxide and magnesium oxide can be used to transfer hafnium oxide into a cubic crystal structure which is not subject to destructive transformation, and that strong gas-tight tubes can be prepared by a slip casting technique[5] from an aqueous slurry containing $HfO_2$, CaO, ammonium alginate, formaldehyde and bentonite.

[4] See, for example, D. W. Stacy and D. R. Wilder, "The Yttria-Hafnia System", Journal of the American Ceramic Society, Vol. 58, No. b 7–8, pp. 285–288 (1975) and J. D. Schieltz, J. W. Patterson and D. R. Wilder, "Electrolytic Behavior of Yttria-Stabilized Hafnia", J. Electrochem. Soc.: Electrochemical Science, Vol. 118, No. 8, pp. 1257–1261 (1971).
[5] U.S. Pat. No. 3,287,143

THE PRESENT INVENTION

The present invention is based upon the discovery that dense and impervious ceramic bodies can be produced at commercially feasible firing temperatures from hafnium oxide stabilized with yttrium oxide, using alumina, bentonite, kaolin, ball clay, a mixture of alumina and silica, a mixture of alumina and bentonite, or a mixture of any of the foregoing with an oxide, hydroxide, or carbonate of an alkaline earth metal as a sintering aid. The fired ceramic should contain substantially 8 to 12 mole percent of the stabilizer, which proportion is substantially the minimum required to achieve stabilization. Larger amounts of the stabilizing oxide are operable, insofar as stability is concerned, but are undesirable because of the adverse influence on electrical properties.

In addition to hafnium oxide and yttrium oxide, the fired ceramic additionally contains an aluminate, a silicate or an alumino-silicate sintering aid. The mechanism by which the sintering aid functions has not been investigated, but it has been found that dense and impervious ceramics can be produced at feasible firing temperatures when from ¼ percent to 4 percent, on an oxide basis, and based upon the weight of the hafnia and yttria, of at least one sintering aid is employed in the green batch. The sintering aid can be alumina, usually added as such, silica, usually added as such, a mixture of alumina and silica, added as a physical mixture of the two, a mixture of alumina and bentonite, bentonite, kaolin or ball clay, or any of the foregoing plus up to about 70 percent by weight of an alkaline earth oxide, usually added as the carbonate or hydroxide.

The addition of a sintering aid influences the chemical composition of the batch and of the final ceramic article to a comparatively small extent. Specifically, it introduces from ¼ percent to 4 percent, based upon the weight of hafnia and yttria in the fired article, of silica, alumina, calcia, magnesia, baria, strontia or mixtures, with the proviso that calcia, magnesia, baria and strontia constitute not more than 70 percent by weight of the total of silica, alumina, calcia, magnesia, baria and strontia. Preferably, on the indicated basis, silica and the like constitute from ½ to 3 percent of the final article and, most desirably, they constitute from ¾ to 2 percent.

The following detailed Examples are presented solely for the purpose of further illustrating and disclosing, and are not to be construed as limiting, the invention. Examples 1 and 2 constitute the best presently known mode.

EXAMPLE 1

An alumina lined ball mill was charged with 10.6 parts by weight yttria, 88.4 parts by weight hafnia[6], 1 part by weight bentonite[7] and ½ part by weight oleic acid. The mill contained alumina balls, grinding ratio 10:1. The charge was dry milled for ten hours; solid cylindrical slugs ½ inch in diameter and ½ high were then pressed from the milled charge, pressure 5000 pounds per square inch. The pressed slugs were then fired in a gas fired tunnel kiln (slightly reducing atmosphere): about seventeen hours from ambient temperature of about 75° F. to 2810° F.; about 1 1/5 hours from 2810° F. to 2820° F.; cool. The fired ceramic articles had a bulk density of 8.71 grams per cc.; they were subjected to a water absorption test, and were found to be impervious (zero open porosity).

[6] Like most commercial grades of hafnia, the material used was contaminated with zirconia. The particular sample assayed substantially 99 percent by weight of hafnia, and contained about 1 percent by weight of zirconia.
[7] The bentonite used yielded, when fired under the conditions in question, 0.84 part by weight of silica and alumina, 0.21 part alumina and 0.63 part silica.

When, for purposes of comparison, but not in accordance with the invention, the procedure described above in Example 1 was repeated, except that the charge was 10.7 parts by weight yttria, 89.3 parts by weight of the hafnia and ½ part by weight oleic acid, the fired ceramic had a bulk density of 8.44 grams per cc. and a water absorption of 0.4 percent by weight.

EXAMPLE 2

The procedure described above in Example 1 was repeated, using a batch (parts by weight) of 87.5 hafnia, 10.5 yttria, 2.0 bentonite and ½ oleic acid. The fired ceramic had zero percent water absorption and a bulk density of 8.65 grams per cc. The data in Examples 1 and 2 and that described in the preceding paragraph were collected in connection with a series of experiments conducted together. The same is true of the data in Examples 3–14 and the associated controls (2 through 6), that in Examples 15–21 and the associated controls (7 through 11) and that in Examples 22–24 and Control 12. Accordingly, the numerical values for bulk density collected in each of the three series of experiments can be compared; however, the differences in bulk density among the controls of the three series are sufficiently great to indicate that valid comparisons cannot be made between a bulk density from one series and a bulk density from another series.

EXAMPLES 3–21

A modification of the procedure described above in Example 1 where the pressed slugs were fired in a periodic gas-fired (slightly reducing atmosphere), total cycle about fourteen hours, four hours to temperature and a two hour dwell, followed by cooling, has been used to produce fired hafnia ceramic articles from batches other than that described in Example 1. Bodies of each composition were fired to five different temperatures: 2600° F., 2700° F., 2800° F., 2900° F. and 3000° F. The different batches, the optimum firing temperature, i.e., the firing temperature at which the highest bulk density was achieved, the bulk density and the percent of water absorption for each of the fired ceramics are set forth in the following Table wherein data concerning specimens identified as "controls" relate to ceramic articles produced by a method which is not according to the invention because no sintering aid was used.

| Example | Hafnia | Yttria | $Al_2O_3$ | Ball Clay | $SiO_2$ | Bentonite | Kaolin | Optimum Firing Temperature | Bulk density, grams per cc. | Weight percent Water absorption |
|---|---|---|---|---|---|---|---|---|---|---|
| 3 | 88.4 | 10.6 | ½ | — | ½ | — | — | 3000° F. | 8.61 | 0 |
| 4 | 87.5 | 10.5 | 1 | — | 1 | — | — | 2800° F. | 8.42 | 0 |
| 5 | 88.4 | 10.6 | — | — | — | — | 1 | 3000° F. | 8.65 | 0 |
| 6 | 87.5 | 10.5 | — | — | — | — | 2 | 2800° F. | 8.53 | 0 |
| 7 | 86.6 | 10.4 | — | — | — | — | 3 | 2700° F. | 8.35 | 0 |
| 8 | 88.4 | 10.6 | — | 1 | — | — | — | 3000° F. | 8.55 | 0 |
| 9 | 87.5 | 10.5 | — | 2 | — | — | — | 3000° F. | 8.55 | 0 |
| 10 | 86.6 | 10.4 | — | 3 | — | — | — | 2800° F. | 8.37 | 0 |
| 11 | 88.0 | 10.5 | 1 | — | — | ½ | — | 2900° F. | 8.60 | 0 |
| 12 | 87.5 | 10.5 | 1 | — | — | 1 | — | 2800° F. | 8.56 | 0 |
| 13 | 87.0 | 10.4 | 1 | — | — | 1½ | — | 2700° F. | 8.50 | 0 |
| 14 | 86.6 | 10.4 | 1 | — | — | 2 | — | 2700° F. | 8.37 | 0 |
| Control 2 | 89.3 | 10.7 | — | — | — | — | — | 2600° F. | 8.17 | 1.0 |
| Control 3 | 89.3 | 10.7 | — | — | — | — | — | 2700° F. | 8.24 | 0.9 |
| Control 4 | 89.3 | 10.7 | — | — | — | — | — | 2800° F. | 8.26 | 0.6 |
| Control 5 | 89.3 | 10.7 | — | — | — | — | — | 2900° F. | 8.25 | 0.7 |
| Control 6 | 89.3 | 10.7 | — | — | — | — | — | 3000° F. | 8.24 | 0.8 |
| 15 | 88.4 | 10.6 | 1 | — | — | — | — | 3000° F. | 8.69 | 0 |
| 16 | 87.5 | 10.5 | 2 | — | — | — | — | 3000° F. | 8.62 | 0 |
| 17 | 86.6 | 10.4 | 3 | — | — | — | — | 2900° F. | 8.52 | 0 |
| 18 | 88.4 | 10.6 | — | — | — | 1 | — | 2900° F. | 8.64 | 0 |
| 19 | 87.5 | 10.5 | — | — | — | 2 | — | 2700° F. | 8.63 | 0 |
| 20 | 86.6 | 10.4 | — | — | — | 3 | — | 2700° F. | 8.42 | 0 |
| 21 | 86.6 | 10.4 | — | — | 3.0 | — | — | 3000° F. | 8.52 | 0 |
| Control 7 | 89.3 | 10.7 | — | — | — | — | — | 2600° F. | 8.35 | 0.6 |
| Control 8 | 89.3 | 10.7 | — | — | — | — | — | 2700° F. | 8.40 | 0.5 |
| Control 9 | 89.3 | 10.7 | — | — | — | — | — | 2800° F. | 8.34 | 0.6 |
| Control 10 | 89.3 | 10.7 | — | — | — | — | — | 2900° F. | 8.39 | 0.3 |
| Control 11 | 89.3 | 10.7 | — | — | — | — | — | 3000° F. | 8.36 | 0.5 |

EXAMPLES 22–24

Ceramic articles have also been produced according to the method of the invention containing ½ percent by weight of at least one sintering aid. Bodies of each composition were fired to five different temperatures: 2700° F. and 2800° F. in air; 2900° F. as described in Examples 3–21; as described in Example 1, and by a procedure similar to that described in Example 1, but with a higher peak temperature of about 3050° F. The different batches, the bulk density and the percent of water absorption for each of the fired ceramics are set forth in the following Table. All data in the Table relate to the 2900° F. firing which was found to be optimum, i.e., to give the highest bulk density. Data concerning the specimen identified as a "control" relates to an article produced by a method which is not according to the invention because no sintering aid was used.

| Example | Hafnia | Yttria | $Al_2O_3$ | Ball Clay | $SiO_2$ | Bentonite | Kaolin | Bulk density, grams per cc. | Weight percent Water absorption |
|---|---|---|---|---|---|---|---|---|---|
| 22 | 88.9 | 10.6 | ¼ | — | ¼ | — | — | 8.74 | 0 |
| 23 | 88.9 | 10.6 | — | — | — | — | ½ | 8.73 | 0 |
| 24 | 88.9 | 10.6 | — | — | — | ½ | — | 8.60 | 0 |
| Control 12 | 89.3 | 10.7 | — | — | — | — | — | 8.41 | 0.5 |

The procedure described in Example 1, above, was repeated to produce twenty specimens, ten containing 1 percent of bentonite and ten without bentonite. Five specimens containing bentonite and five without bentonite were fired in an electric-heated kiln to a maximum temperature of 2830° F., dwell time at maximum temperature 1½ hours. The atmosphere in the kiln was air. Ten other specimens, five containing bentonite and five without bentonite, were fired in a direct, gas-fired kiln which had an atmosphere that was slightly reducing by comparison with air; the peak temperature and soak period were equivalent to those in the electric kiln. Bulk density and water absorptions were determined for the fired specimens; the results are set forth in the following Table:

|  | Bulk Density (g/cc) ± Standard Deviation | Weight Percent Water Absorption |
|---|---|---|
| Samples containing 1% Bentonite Reducing Atmosphere | 8.71 ± .02 | 0 |
| Air Atmosphere | 8.73 ± .03 | 0 |
| Control Samples (no bentonite) Reducing Atmosphere | 8.38 ± .02 | 0.4 |
| Air Atmosphere | 8.42 ± .02 | 0.5 |

It will be appreciated from the foregoing data that the atmosphere in which refractories are produced in accordance with the present invention is not critical. Substantially identical results were achieved when the firing was in air as when the firing was in a slightly reducing atmosphere in a direct-fired kiln.

It will be apparent that various changes and modifications can be made from the specific details set forth in the foregoing Examples and described herein without departing from the spirit and scope of the invention as defined in the appended claims, and that, in its essential details, the present invention is a method for producing a ceramic article, which method consists essentially of producing an intimate dry mixture consisting essentially, on an oxide basis, of hafnia, yttria and at least one oxide selected from the group consisting of silica, alumina, calcia, magnesia, baria and strontia, yttria constituting substantially 8 to 12 mole percent of said article based upon the total number of moles of hafnia and yttria, and silica, alumina, calcia, magnesia, baria and strontia constituting from one-fourth percent to 4 percent, based upon the weight of hafnia and yttria, with the proviso that calcia, magnesia, baria and strontia constitute not more than 70 percent by weitht of the total of silica, alumina, calcia, magnesia, baria and strontia, pressing the dry mixture into a predetermined shape, and sintering the shape to a gas impervious condition at a temperature from 2700° F. to 3000° F.

What I claim is:

1. A method for producing a gas impervious ceramic article, said method consisting essentially of producing an intimate dry mixture consisting essentially, on an oxide basis, of hafnia, yttria and at least one oxide selected from the group consisting of silica, alumina, calcia, magnesia, baria and strontia, yttria constituting substantially 8 to 12 mole percent of said article based upon the total number of moles of hafnia and yttria, and silica, alumina, calcia, magnesia, baria and strontia constituting from ¼ percent to 4 percent, based upon the weight of hafnia and yttria, with the proviso that calcia, magnesia, baria and strontia constitute not more than 70 percent by weight of the total of silica, alumina, calcia, magnesia, baria and strontia, pressing the dry mixture into a predetermined shape, and sintering the shape to a gas impervious condition at a temperature from 2700° F. to 3000° F.

* * * * *